United States Patent [19]
Dorius et al.

[11] Patent Number: 5,926,343
[45] Date of Patent: Jul. 20, 1999

[54] AIR BEARING SLIDER WITH REDUCED CONTAMINATION SENSITIVITY AND METHOD FOR MAKING THE SAME

[75] Inventors: Lee Kevin Dorius, San Jose; Paul R. Peck, Santa Clara, both of Calif.

[73] Assignee: International Business Machines Corporation, Armonk, N.Y.

[21] Appl. No.: 08/753,831

[22] Filed: Dec. 2, 1996

[51] Int. Cl.⁶ .................................................. G11B 5/60
[52] U.S. Cl. ............................................................ 360/103
[58] Field of Search .............................................. 360/103

[56] References Cited

U.S. PATENT DOCUMENTS

| | | | |
|---|---|---|---|
| 4,212,044 | 7/1980 | Plotto | 360/103 |
| 5,019,930 | 5/1991 | Takeya | 360/103 |
| 5,210,666 | 5/1993 | Chapin et al. | 360/103 |
| 5,396,387 | 3/1995 | Murray | 360/103 |
| 5,430,591 | 7/1995 | Takeuchi et al. | 360/103 |
| 5,490,025 | 2/1996 | Dorius et al. | 360/103 |
| 5,490,026 | 2/1996 | Dorius et al. | 360/103 |
| 5,761,004 | 6/1998 | Peck | 360/103 |

FOREIGN PATENT DOCUMENTS

| | | |
|---|---|---|
| 1-245480 | 9/1989 | Japan . |
| 3-125378 | 5/1991 | Japan . |
| 4-167278 | 6/1992 | Japan . |
| 4-228157 | 8/1992 | Japan . |

OTHER PUBLICATIONS

"Raised–Taper Slider", IBM Technical Disclosure Bulletin, vol. 34, No. 4A, Sep. 1991, p. 21.

"Magnetic Head with Arrow–Shaped Air Bearing Surface", Research Disclosure, 32170, Jan. 1991.

IBM TDB, v.37 n.4A, Apr. 1994, p. 83ff, "Machinable, High Pitch Angle Slider Reduced Probability of Taper Debris Accumulation".

IBM TDB, v.34 n. 4A, Sep. 1992, p. 21, "Raised–Taper Slider".

*Primary Examiner*—Robert S. Tupper
*Attorney, Agent, or Firm*—Merchant, Gould, Smith, Edell, Welter & Schmidt, P.A.

[57] ABSTRACT

A slider air bearing surface design which significantly reduces the fly height sensitivity to contamination in the crossbar area. A structural feature at the leading edge provides contamination protection to the air bearing surface. The slider includes a slider body having an air bearing surface formed on a lower surface, wherein the air bearing surface comprises a crossrail and a central rail extending from the crossrail toward a leading edge for diverting debris from the air bearing surface to prevent accumulation thereon. The leading central rail includes a flared edge connecting the central rail to the crossrail, wherein the flared edge expands the width of the central rail toward the crossrail. A trailing center rail extends from the crossbar toward the trailing edge, and is narrower than the leading central rail. Further, the trailing center rail may be skewed relative to the sides of the slider body. The trailing center rail may also include a broadened support structure for supporting a transducer thereon. In addition, the side edges of the trailing center rail may be flared.

10 Claims, 14 Drawing Sheets

FIG. 6A

| PARAMETER | | FIG. 1 | FIG. 5 |
|---|---|---|---|
| ELEMENT SIGMA (NM) | ID<br>OD | 4.8<br>7.8 | 4.7<br>7.6 |
| MIN SIGMA (NM) | ID<br>OD | 5.6<br>5.3 | 5.5<br>6.2 |
| (ELEM − MIN) (NM) | ID<br>OD | −0.1<br>−4.8 | −3.2<br>−4.5 |
| PITCH ANGLE (UR) | ID<br>OD | 195<br>292 | 226<br>334 |
| ROLL ANGLE (UR) | ID<br>OD | −5.6<br>32.8 | −17.2<br>27.0 |
| SEEK CHANGE (NM) | ID<br>OD | −4.3<br>+1.2 | −4.0<br>+0.2 |
| TAKE OFF VEL (M/S) | ID | 4.9 | 5.1 |
| FH PROFILE DELTA (REF POR) | | − | −0.4NM |

FIG. 6B

FLY HEIGHT LOSS DUE TO NOTCH DEBRIS

| PARAMETER | | FIG. 1 | FIG. 5 |
|---|---|---|---|
| 100 NM HIGH | ID<br>OD | −8.8<br>−12.4 | −0.6<br>−1.1 |
| MAX HIGH | ID<br>OD | −29.0<br>−40.0 | −2.6<br>−11.2 |

AIR BEARING SLIDER WITH REDUCED CONTAMINATION SENSITIVITY AND METHOD FOR MAKING THE SAME

BACKGROUND OF THE INVENTION

1. Field of the Invention.

This invention relates in general to air bearing sliders for use with recording media and more particularly, to a slider having air bearing surface features which minimize contamination sensitivity.

2. Description of Related Art.

A magnetic storage device typically comprises one or more magnetic disks, each having at least one data recording surface including a plurality of concentric tracks of magnetically stored data, means such as a spindle motor for supporting and rotating the disk(s), at least one read/write transducer per recording surface for reading information from and writing information to the recording surface, an air bearing slider for supporting the transducer over the recording surface, and means such as an actuator/suspension assembly for selectively positioning the transducer and slider over a desired data track.

As is generally known in the art, airflow enters the slider's leading edge and flows in the direction of its trailing edge, generating a lifting force or "positive pressure" on the slider's air bearing surface (ABS), thereby supporting the slider at a nominal fly height over the recording surface.

As is also known in the art, numerous air bearing designs exist to achieve particular fly height characteristics. Many of these designs include air bearing designs that provide openings to the incoming airflow. A problem with such designs occurs when debris enters these openings and accumulates on the air bearing surface. Particles may occur, for example, during the manufacture or assembly of the disk drive, from moving parts that wear over a period of time, a faulty air filtering system, or slider contact with disk asperities. If the particles are small, they will merely pass beneath the air bearing surface unobstructed. However, larger particles of debris will accumulate, for example, by encountering obstructing features such as crossrails. As a result, the debris buildup can affect the fly height sensitivity of the slider, scratch the recording surface, damage the delicate transducer or interfere with the transducer's operation.

A number of design approaches have been taken to deal with surface debris. For example, U.S. Pat. No. 4,212,044 discloses a positive pressure slider with an air bearing surface comprising a pair of side rails and a plurality of shaped diverter blades at the trailing edge and parallel to the incoming airflow. The diverter blades force small particles of dust to either side, preventing the accumulation of dust along the trailing edge. However, this design will not prevent larger particles from accumulating along the air bearing surface.

U.S. Pat. No. 5,210,666 discloses a negative pressure slider with a notch formed in its tapered cross-rail, functioning in part to minimize debris collection at the slider's leading edge. Rather than preventing particles from passing beneath the air bearing surface, this design permits relatively small particles to pass under the air bearing surface so that they do not accumulate at the leading edge.

As is generally known in the art, a negative pressure slider design includes a region for generating a suction force to counteract and stabilize the positive pressure on the air bearing surface. Japanese application no. 4-228157 discloses a negative pressure slider having two T-shaped rails defining a negative pressure cavity with a shallow groove opening to the leading edge. The groove provides a channel for debris so that it does pass beneath the slider and therefore does not accumulate along the leading edge. However, this channel affects the negative pressure created by the negative pressure cavity thereby affecting the fly height of the slider.

I.B.M. Technical Disclosure Bulletin Vol. 35, No. 7, page 14, December 1992 discloses a slider for use in a rotary actuator disk drive, including a skewed rail for sweeping aside particles on the disk surface. This design is useful for pushing aside particles too large to pass beneath the slider air bearing surface, but would not prevent all large particles from lodging between the slider and recording surface or from accumulating along the crossbar.

As a result of debris buildup in the crossbar area, air bearing surface (ABS) designs lose fly height. This has been observed in sliders from file testing as well as in component particle injection testing.

It can be seen then that there is a need to prevent debris from collecting in the crossbar region.

It can also be seen then that there is a need for a slider air bearing surface design which significantly reduces the fly height sensitivity to contamination in the crossbar area.

It can also be seen that there is a need for a method of making a slider air bearing surface design with significantly reduced fly height sensitivity to contamination in the crossbar area.

SUMMARY OF THE INVENTION

To overcome the limitations in the prior art described above, and to overcome other limitations that will become apparent upon reading and understanding the present specification, the present invention discloses a slider air bearing surface design which significantly reduces the fly height sensitivity to contamination in the crossbar area.

The present invention solves the above-described problems by providing a structural feature to provide contamination protection to the crossrail or crossbar.

A slider in accordance with the principles of the present invention includes a slider body having an air bearing surface formed on a lower surface, wherein the air bearing surface comprises a crossrail and a central rail extending from the crossrail toward a leading edge for diverting debris from the crossrail to prevent accumulation thereon.

The invention may be applied to sliders of various configurations including, but not limited to, sliders having at least one large opening at the leading edge. Further, multiple blocking structures may be utilized and the location of the contamination blocking structure may be selected to minimize fly height sensitivity to contamination. Furthermore, the invention is equally applicable to sliders having more than one opening at the leading edge.

One aspect of the present invention is that the leading central rail comprises a flared portion connecting the central rail to the crossrail.

Another aspect of the present invention is that the width of the central rail widens toward the crossrail.

Another aspect of the present invention is that the trailing center rail extending from the crossbar toward the trailing edge is narrower than the flared portion of the leading central rail.

Yet another aspect of the present invention is that the leading center rail is skewed relative to the sides of the slider body.

Another aspect of the present invention is that the trailing center rail comprises a broadened support structure for sustaining a transducer thereon.

Another aspect of the present invention is that the trailing center rail includes side edges that are flared to widen the center rail.

Still another aspect of the present invention is that the side edges are flared linearly.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 6a shows a table of modeling results comparing the performance of the slider illustrated in FIG. 5 to the performance of the slider design from FIG. 1;

FIG. 6b is a table showing that fly heights changed as a function of crossbar debris;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides for an slider air bearing surface design including a contamination deflecting surface proximate to an opening at the leading edge. Thus, the present invention significantly reduces the fly height sensitivity to contamination accumulating on the air bearing surfaces.

Figure 1:
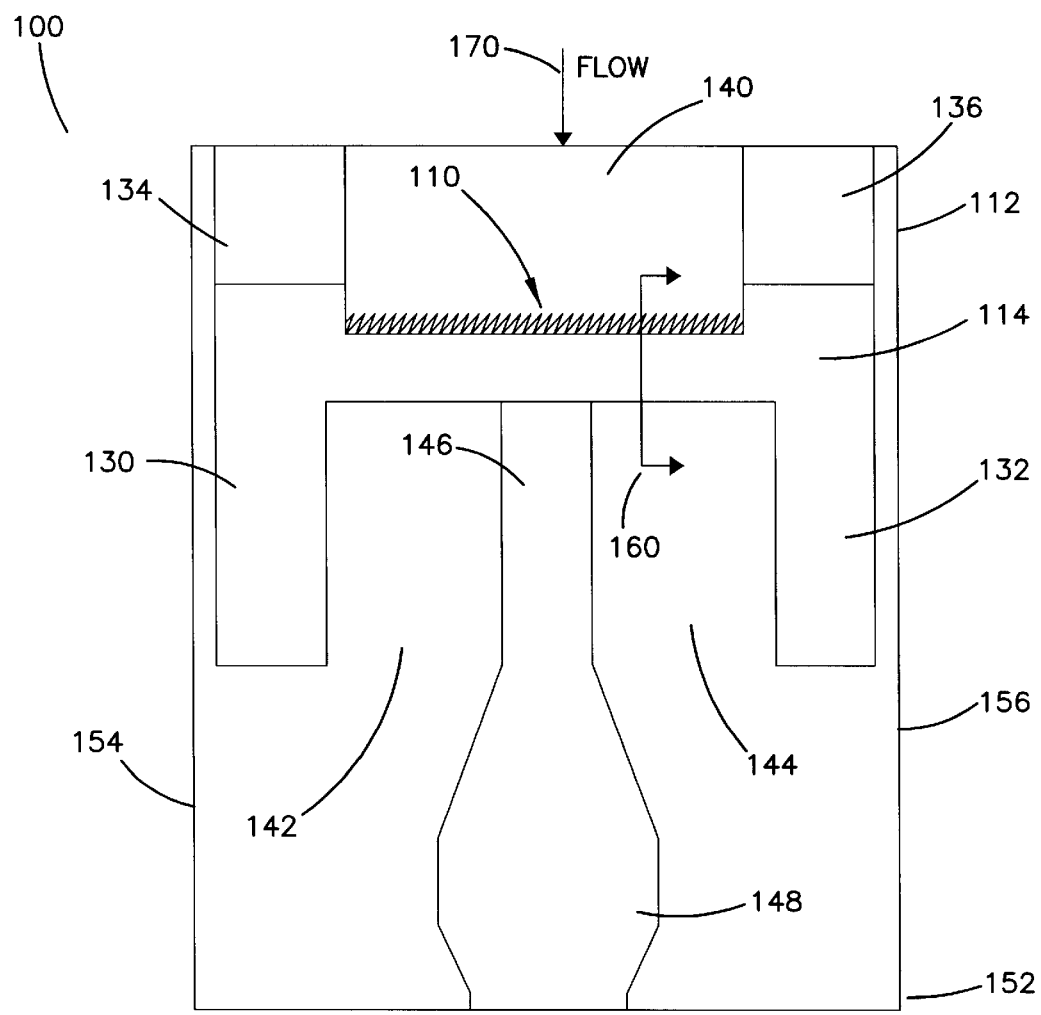
FIG. 1 illustrates a slider design 100 that exhibits flyability problems due to debris contamination.

FIG. 1 illustrates a slider design 100 that exhibits fly height sensitivity to debris contamination. Failure analysis of this design has shown debris particles 110 collecting at the leading edge 112 in crossbar area 114. The slider design 100 includes a pair of shortened side rails 130, 132 along first and second side edges 154, 156. Each side rail 130, 132 includes compression features 134, 136 to provide greater lift at start up. The compression features 134, 136 may be tapered or alternatively may be stepped. Negative pressure regions 142, 144 are defined by side rails 130, 132, crossrail 114 and center rail 146 which extends toward the trailing edge 152 of the slider forming a broadened support surface area 148 whereon a transducer may be disposed (not shown). A leading edge pocket 140 is defined by the side rails 130, 132, and crossrail 114. Atomic force microscopic (AFM) analysis has been used to determined the location and amount of debris buildup on such a slider design.

Figure 2:
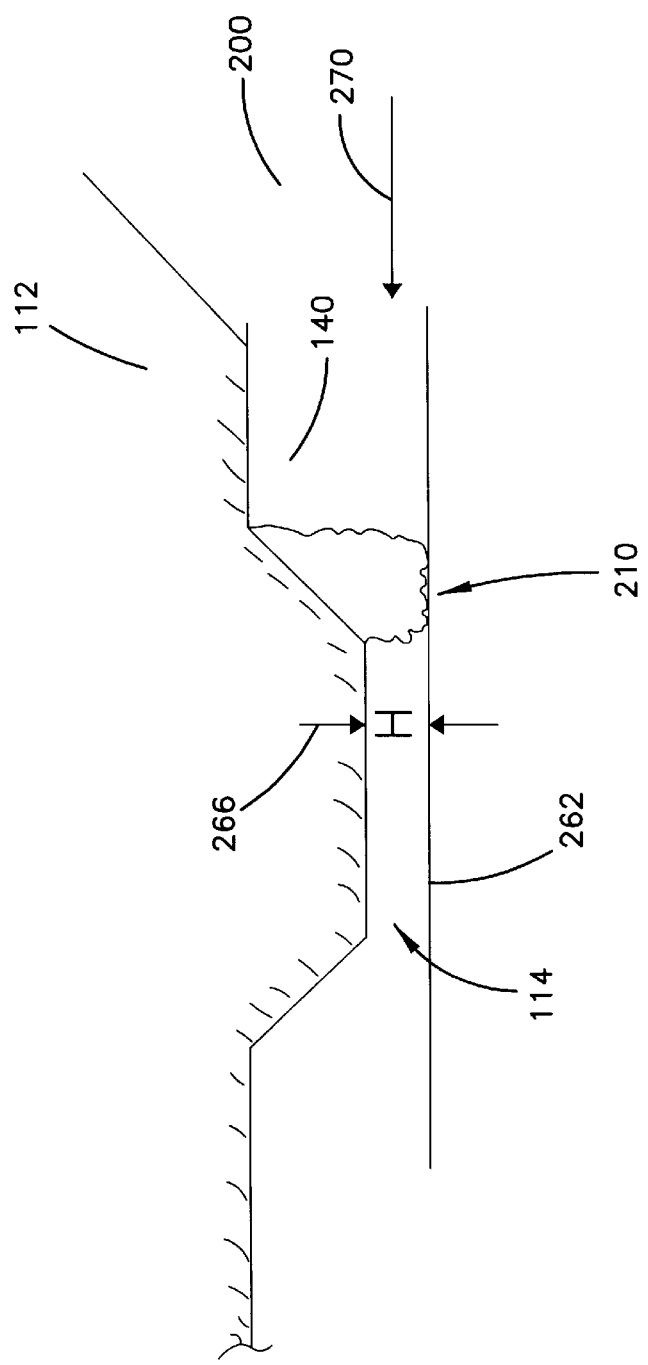
FIG. 2 is a cross-sectional view 200 of the slider design of FIG. 1.

FIG. 2 is a cross-sectional view 200 of the slider design of FIG. 1 along line 160 as it flies above a disk surface 262. FIG. 2 illustrates the debris buildup 210 above the crossbar 114 along cross-section 160 of FIG. 1.

Figure 3:
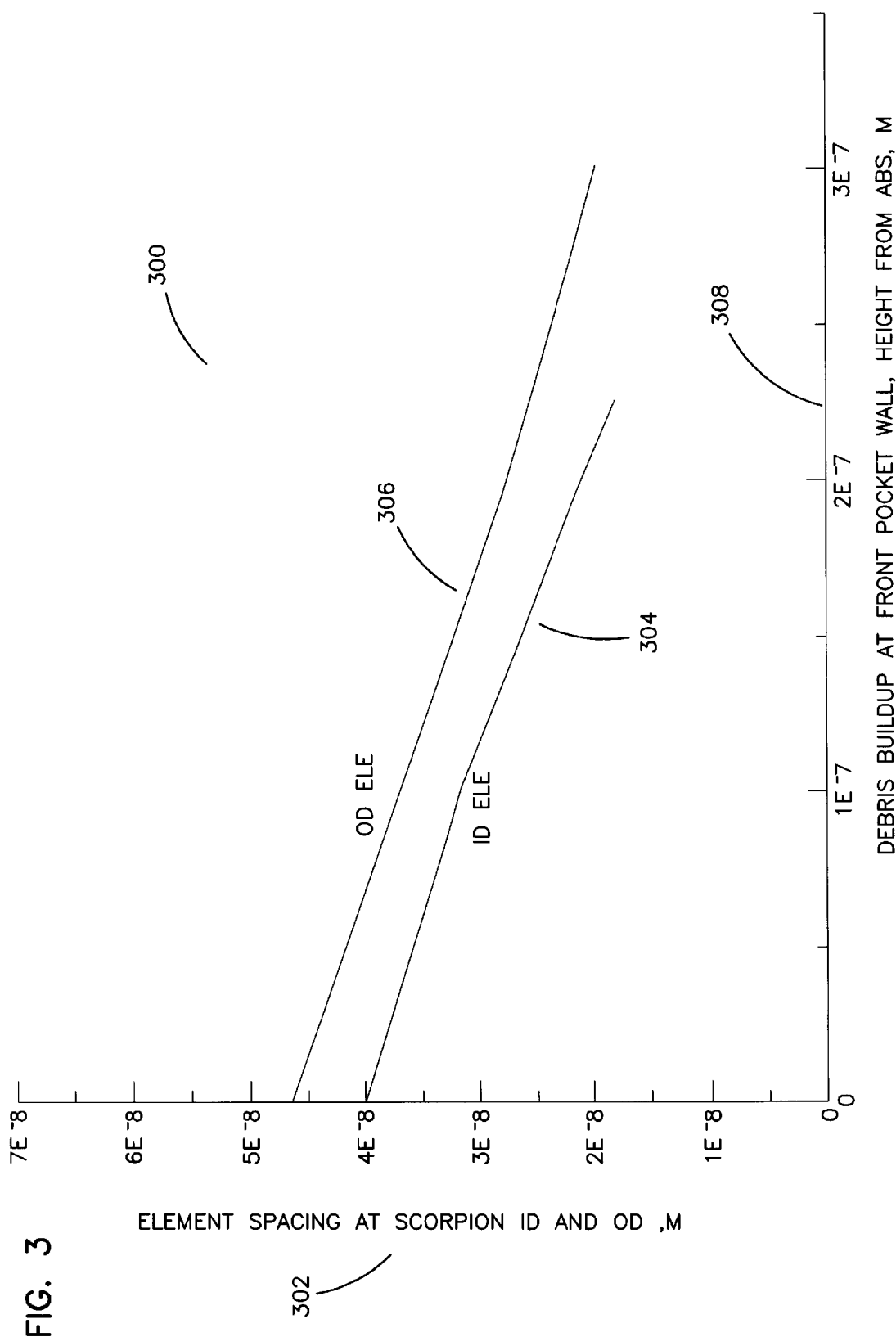
FIG. 3 illustrates a graph showing that the inner diameter and outer diameter fly height drops as a function of the height of the debris buildup.

FIG. 3 illustrates a graph 300 that models the resulting fly height 302 showing that the inner diameter 304 and outer diameter 306 fly heights drop as function of the height of the debris buildup 308. The effect of the height of the debris 308 is to block air flow downstream preventing air compression on the center rail and hence lowering fly height 302. Further detailed analysis of the sensitivity of fly height to crossbar debris by location along the crossbar has determined the most sensitive region to occur in front of and slightly to the right of the center rail.

Figure 4:
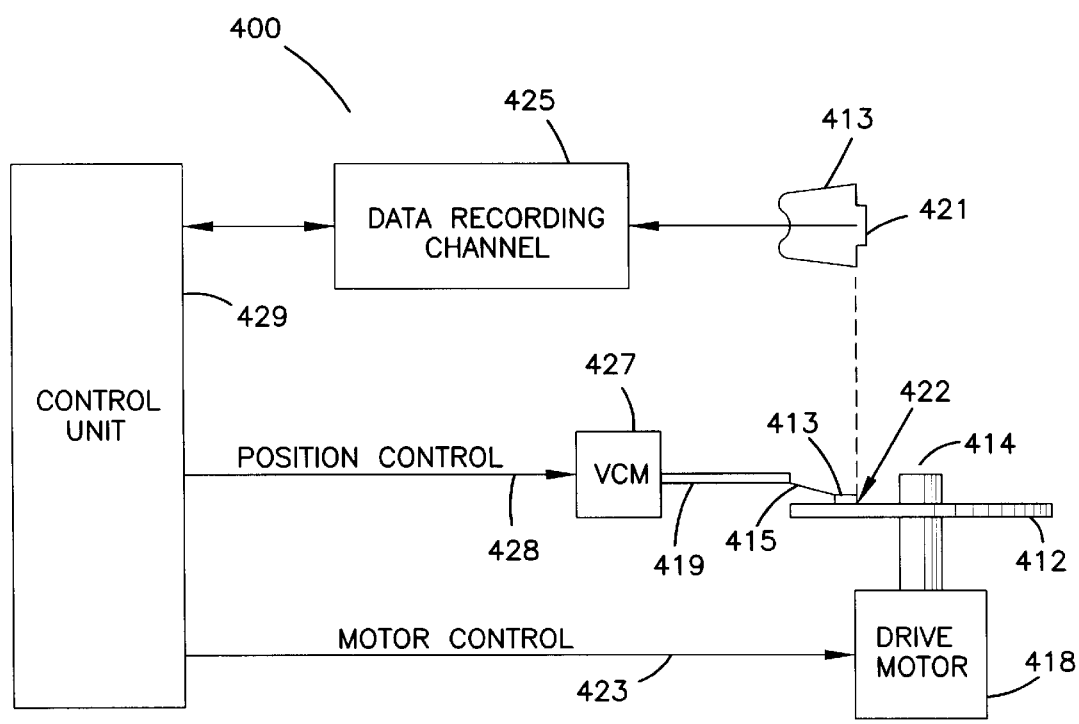
FIG. 4 illustrates a magnetic disk storage system.

FIG. 4 illustrates a magnetic disk storage system 400. The magnetic disk storage system 400 includes at least one storage medium such as a rotatable magnetic disk 412. The magnetic disk 412 is supported on a spindle 414 and rotated by a disk driver motor 418 with at least one slider 413 positioned on the disk 412, each slider 413 supporting one or more magnetic read/write transducers 421, commonly referred to in the art as read/write heads.

The magnetic recording media on each disk is in the form of an annular pattern of concentric tracks (not shown) on disk 412. As the disk 412 rotates, the slider 413 is moved radially or along an arcuate path over the disk surface 422 so that the heads 421 may access different portions of the disk where desired data is recorded.

Each slider 413 is attached on its upper surface to an actuator arm 419 by means of a suspension 415. The suspension 415 provides a light spring force which biases the slider 413 against the disk surface 422. Each actuator arm 419 is attached to an actuator means 427. The actuator means 427 may be a voice coil motor (VCM), as shown for example in FIG. 4. The VCM 427 comprises a coil moveable within a fixed magnetic field, the direction and velocity of the coil movements being controlled by signal 428 supplied by a controller 429.

During operation of the disk storage system, the rotation of the disk 412 generates an air bearing between the slider 413 and disk surface 422 which exerts an upward force or positive pressure on the lower surface of the slider. This lower or air bearing surface (ABS) typically includes a plurality of air bearing rails shaped to provide desired flying characteristics. The positive pressure generated on these rails counterbalances the slight spring force of the suspension 415 and supports the slider 413 off and slightly above the disk surface by a small, substantially constant spacing during operation.

The various components of the disk storage system are controlled in operation by control signals generated by control unit 429, such as access control signals and internal clock signals. Typically, the control unit 429 comprises logic control circuits, storage means and a microprocessor, for example. The control unit 429 generates control signals to control various system operations such as drive motor control signals 423 and head position and seek control signals 428. The control signals on line 428 provide the desired current profiles to optimally move and position a selected slider 413 to the desired data track on the associated disk 412. Read and write signals are communicated to and from read/write heads 421 by means of recording channel 425.

The above description of a typical magnetic disk storage system, and the accompanying illustration of FIG. 4 are for representation purposes only. It should be apparent that disk storage systems may contain a large number of disks and actuators, and each actuator may support a number of sliders.

Referring again to FIG. 1, an air bearing surface (ABS) of a negative pressure slider 100 which has been used with magnetic storage systems such as the system 400 of FIG. 4 is illustrated. The slider 100 includes a pair of shortened side rails 130, 132, along first and second side edges 154, 156 respectively, and each side rail 130, 132 has compression features 134, 136. As is generally know in the art of slider design, compression features 134, 136 provide improved lift-off performance. The compression features may be tapered, or alternatively may be stepped, for example (not shown). The air bearing surface further includes a leading edge pocket 140 and two negative pressure regions 142, 144. The leading edge pocket 140 is defined by side rails 130, 132 and crossrail 114. The negative pressure regions 142, 144 are further defined by center rail 146 including widened portion 148 which typically supports a transducer (not shown). When subjected to an incoming airflow 170, the negative pressure regions form a suction-like force to counteract the positive pressure generated on the air bearing surface rails. The counteracting force creates a more constant fly height as the slider moves across the disk and is exposed to differing disk velocities. The leading edge pocket 140 allows some airflow into the negative pressure regions in order to reduce the effects of negative pressure at high disk velocities.

In an operational disk drive, air flow into the slider air bearing surface is in the direction of arrow 170, entering the leading edge 112 and continuing toward the trailing edge 152. The negative pressure slider 100 of FIG. 1 is susceptible to debris accumulation 110 in the leading edge pocket 140, which provides a large opening to the incoming air at leading edge 112 and obstructs particles 110 at crossrail 114.

As mentioned above, FIG. 2 shows a cross section of the negative pressure slider 200 of FIG. 1, taken along line 160. The slider is shown suspended in close proximity to a disk recording surface 262 having a slider to disk spacing 266. Debris 210 moving with the moving recording surface 262 has entered the opening 140 at leading edge 112 and become trapped on crossbar 114, as shown. Accordingly, the slider 200 experiences a loss in fly height as debris 210 collects along the crossbar 214.

Figure 5:
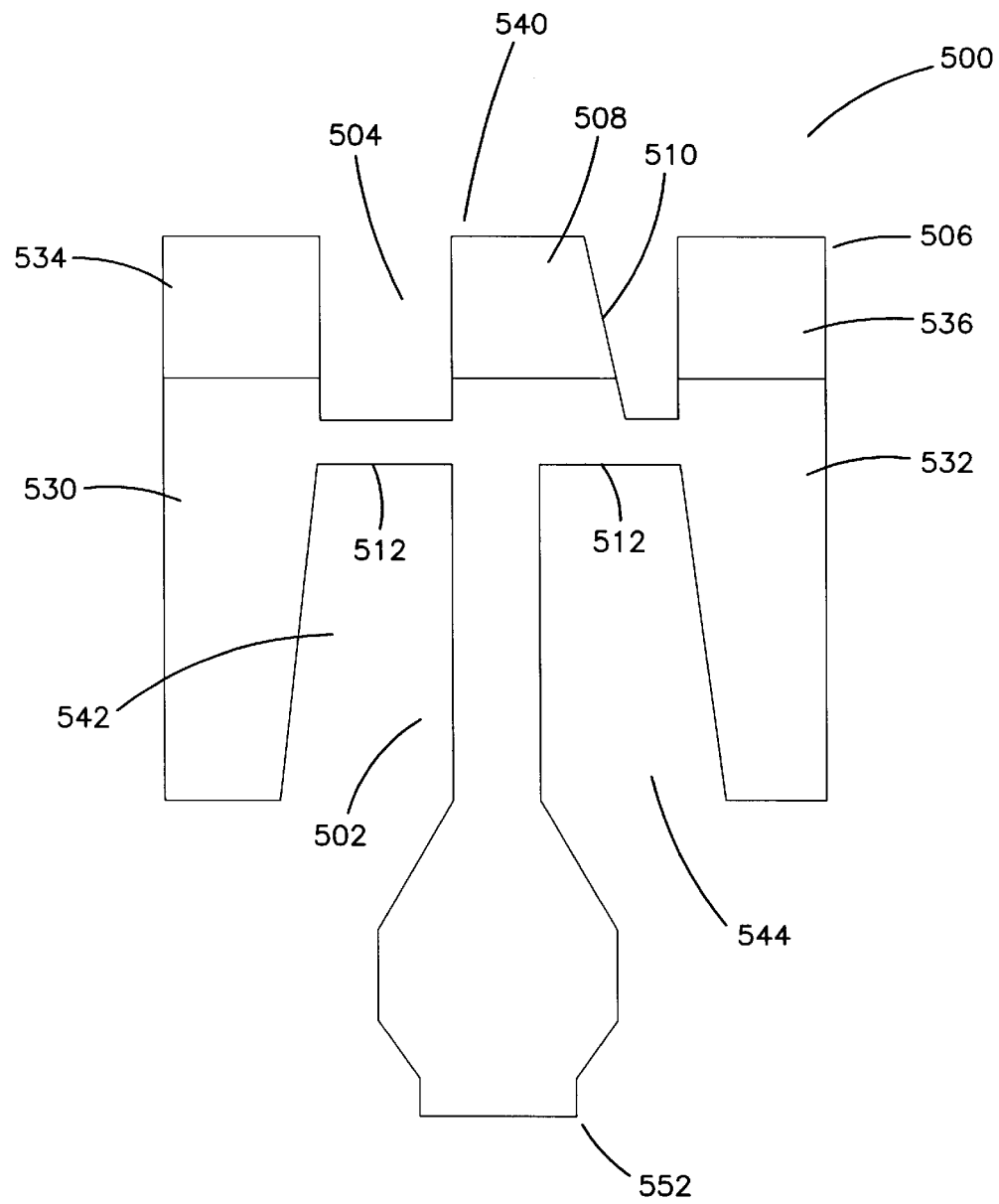
FIG. 5 shows one embodiment of a slider having reduced crossbar contamination sensitivity according to the present invention.

FIG. 5 shows one embodiment of a slider 500 having reduced crossbar contamination sensitivity according to the present invention. The slider 500 includes a pair of shortened side or leg rails 530, 532. Those skilled in the art will recognize that the leg rails may extend from leading edge 506 to the trailing edge 552 and are attached to the crossrail 512. Each side rail 530, 532 also may have compression features 534, 536, respectively. The air bearing surface further includes a leading edge pocket 540 between the leading edges of the side rails 530, 532, and two negative pressure regions 542, 544. The leading edge pocket 540 is defined by side rails 530, 532 and crossrail 512. The slider 500 includes a center rail 502 having an extension 504 extending toward the leading edge 506. The extension 504 includes a taper 508 and a flared portion 510 connecting to the crossbar 512 to one side. As mentioned earlier, the area to one side of center rail 502 at the crossbar 512 is more sensitive to debris accumulation than the other side.

It will be appreciated by those skilled in the art that the present invention may be applied to sliders of various configurations including, but not limited to, sliders having at least one large opening at the leading edge. Those skilled in the art will recognize that multiple blocking structures according to the present invention may be utilized, particularly where multiple openings are present, and that the location of the contamination blocking structure may be selected to minimize fly height sensitivity to contamination. Furthermore, the invention is not meant to be limited to sliders having only one opening at the leading edge.

FIG. 6a shows a table 600 of modeling results comparing the performance of the slider illustrated in FIG. 5 602 to the performance of the slider design from FIG. 1 604. The table 600 shows that the performance of the slider of FIG. 5 602 according to the present invention is slightly better with regard to fly height sigmas 606, 608 except for the outer diameter minimum sigma 610. The slider of FIG. 5 602 has a slightly higher pitch angle 612 and more negative roll 614 at the inner diameter. The slider of FIG. 5 602 has essentially the same seek 616, take-off 618 and profile performance 620 as the slider of FIG. 1 604.

FIG. 6b is a table 650 showing that fly heights changed as a function of crossbar debris. For 100 nm high crossbar debris 660, the slider design of FIG. 5 602 has an inner diameter fly height loss of 0.6 nm 670 as compared to 8.8 nm 672 for the slider of FIG. 1 604. This is a 93% improvement. Also for 100 nm high crossbar debris 660, the slider design of FIG. 5 602 has an outer diameter fly height loss of 1.1 nm 674 as compared to 12.4 nm 676 for the slider of FIG. 1 604. This is a 91% improvement.

For maximum debris height 678, i.e., when debris height modeled is at the highest height possible before touching disk, the slider design of FIG. 5 602 has an inner diameter fly height loss of 2.6 nm 680 as compared to 29.0 nm 682 for the slider of FIG. 1 604. This is a 91% improvement. Also for maximum debris height 678, the slider design of FIG. 5 602 has an outer diameter fly height loss of 11.2 nm 684 as compared to 40.0 nm 686 for the slider of FIG. 1 604. This is a 72% improvement.

Figure 7:
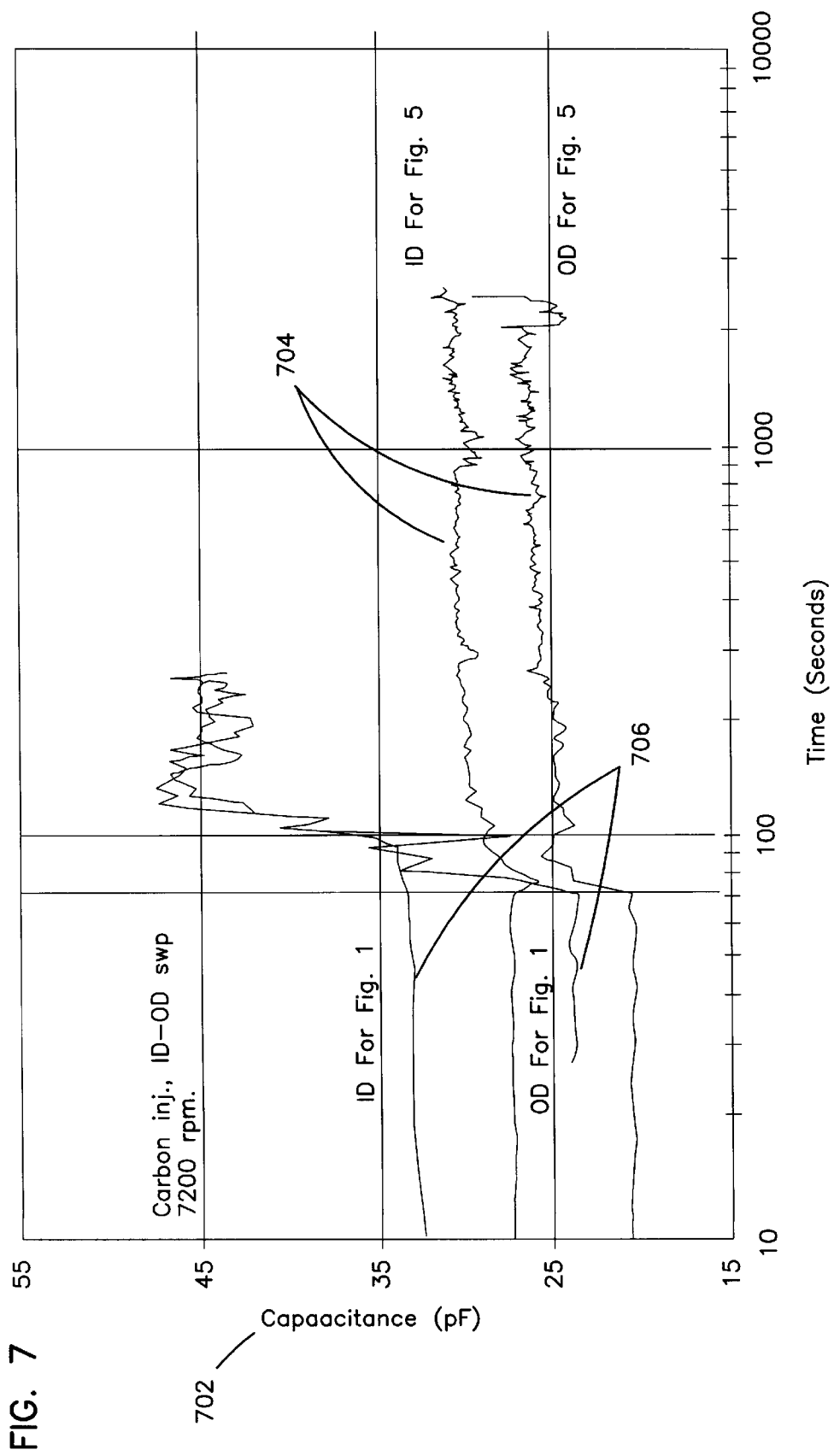
FIG. 7 illustrates the results of carbon injection testing with capacitance measurement which indicates change in fly height for the sliders of FIG. 1 and FIG. 5.

Now referring to FIG. 7, the results of carbon injection testing with capacitance measurement which indicates change in fly height is shown. The results show that the increase in capacitance 702 for the slider design of FIG. 5 704 is less than that of the slider design of FIG. 1 706. Furthermore, the capacitance 702 for the slider design of FIG. 5 704 remains below that of the slider design of FIG. 1 706 for a substantial duration.

Figure 8:
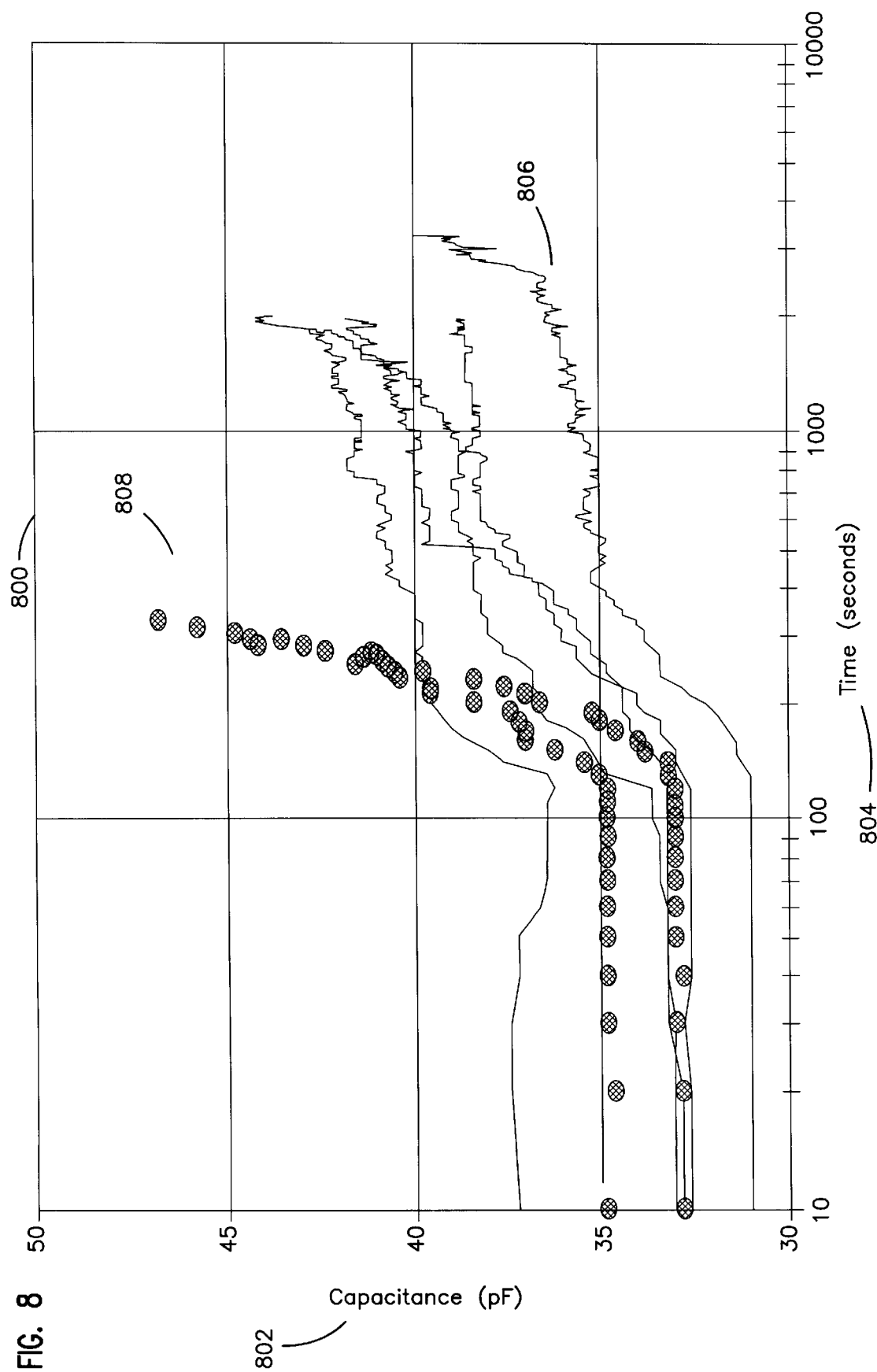
FIG. 8 illustrates capacitance measurement at the inner diameter over time for the sliders of FIG. 1 and FIG. 5.

FIG. 8 is a graph 800 illustrating the capacitance measurement at the inner diameter over time. In FIG. 8, the capacitance 802 at the inner diameter for the slider design of FIG. 5 806 and for the slider design of FIG. 1 808 is illustrated during polystyrene injection. Again, the slider design of FIG. 5 806 shows less capacitance increase over a longer period of time as compared to the slider design of FIG. 1 808. The lower capacitance increase for the slider design of FIG. 5 806 indicates less sensitivity to debris accumulation.

Figure 9:
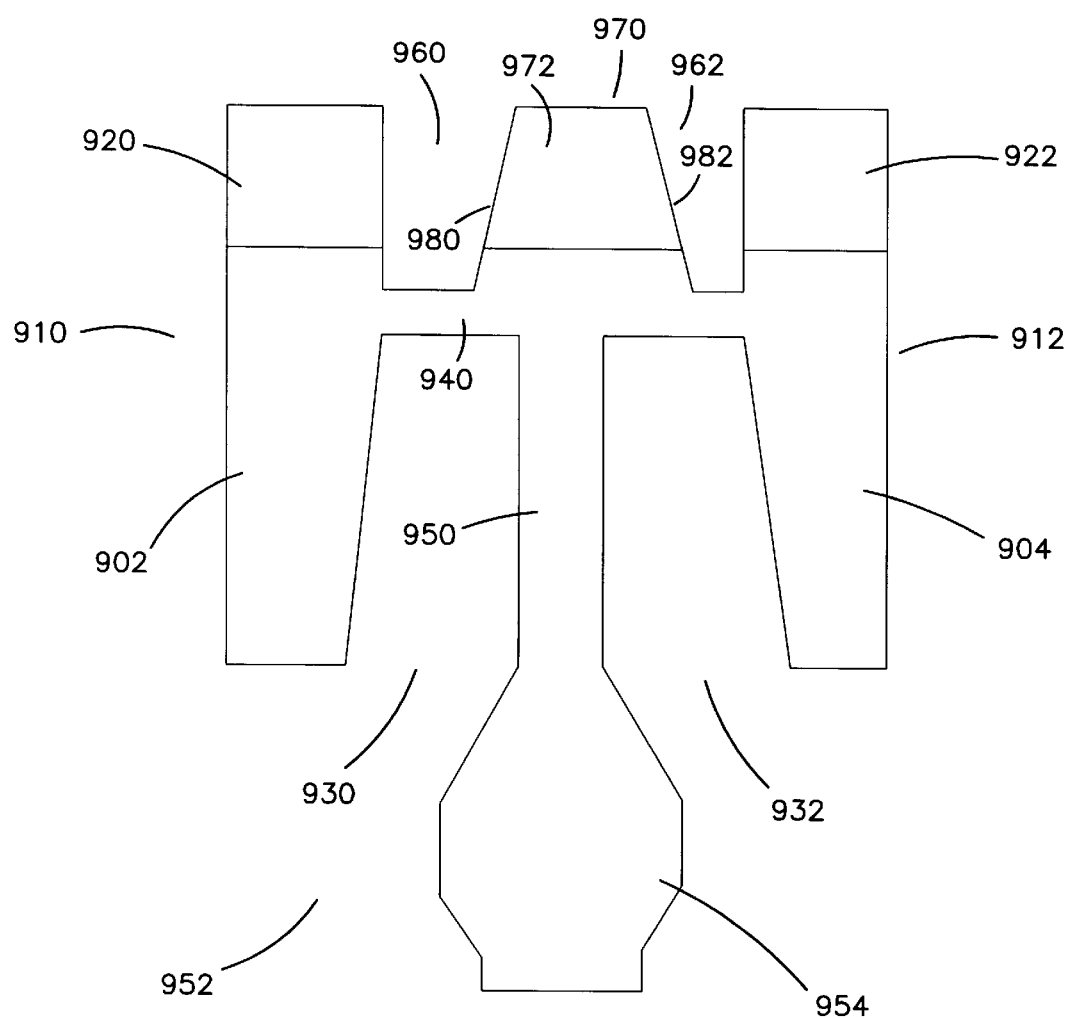
FIG. 9 illustrates an alternative embodiment of a slider design according to the present invention.

FIG. 9 illustrates an alternative embodiment of a slider design 900 according to the invention. The slider design 900 includes a pair of shortened side rails 902, 904, along first and second side edges 910, 912. Each side rail 902, 904 includes compression features 920, 922 to provide greater lift at start up. Again, the compression features 920, 922 may be tapered or alternatively may be stepped, for example. Negative pressure regions 930, 932 are defined by side rails 902, 904, crossrail 940 and center rail 950 which extends toward the trailing edge of the slider 952 forming a broadened support surface area 954 where upon a transducer may be disposed (not shown). Leading edge pockets 960, 962 are defined by the side rails 902, 904, crossrail 940 and a leading edge extension 970. The extension 970 includes a compression feature 972. Further, the extension 970 is flared on both sides 980, 982 to provide a substantially symmetrical air bearing surface for roll control.

Figure 10:
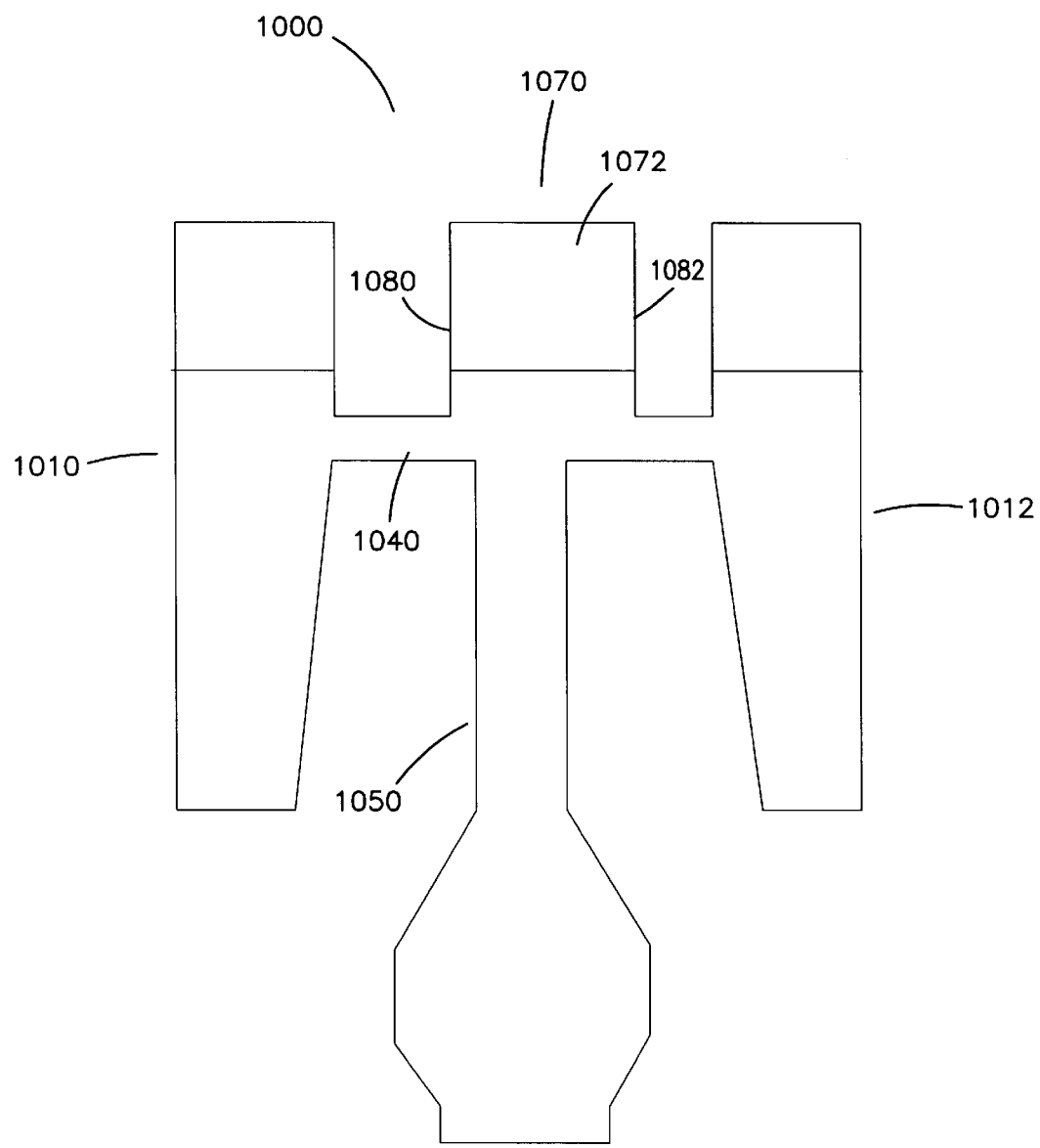
FIG. 10 shows another embodiment of a slider design according to the present invention.

FIG. 10 shows another embodiment of a slider design 1000 according to the present invention. This slider design 1000 is similar to the design illustrated with reference to FIG. 9. The slider 1000 of FIG. 10 includes a center rail extension 1070 having straight edges 1080, 1082 substantially parallel to the sides of the slider 1010, 1012. The extension 1070 includes a taper 1072. However, the straight edges 1080, 1082 are wider than the forward portion of the center rail 1050 extending toward the trailing edge from the crossbar 1040. The straight edges 1080, 1082 maintain debris protection, but reduce the higher taper length sensitivity caused by the flares 980, 982 of FIG. 9. Due to manufacturing tolerances, the length of the taper 972, 1072 may vary. As a result of the variation, the area of the taper 972 of the slider 900 in FIG. 9 varies more than the area of the taper 1072 of the slider 1000 in FIG. 10. Thus, the compression characteristics of the taper 972 for the slider 900 in FIG. 9 is more sensitive to the taper length than the taper 1072 for the slider 1000 in FIG. 10.

Figure 11:
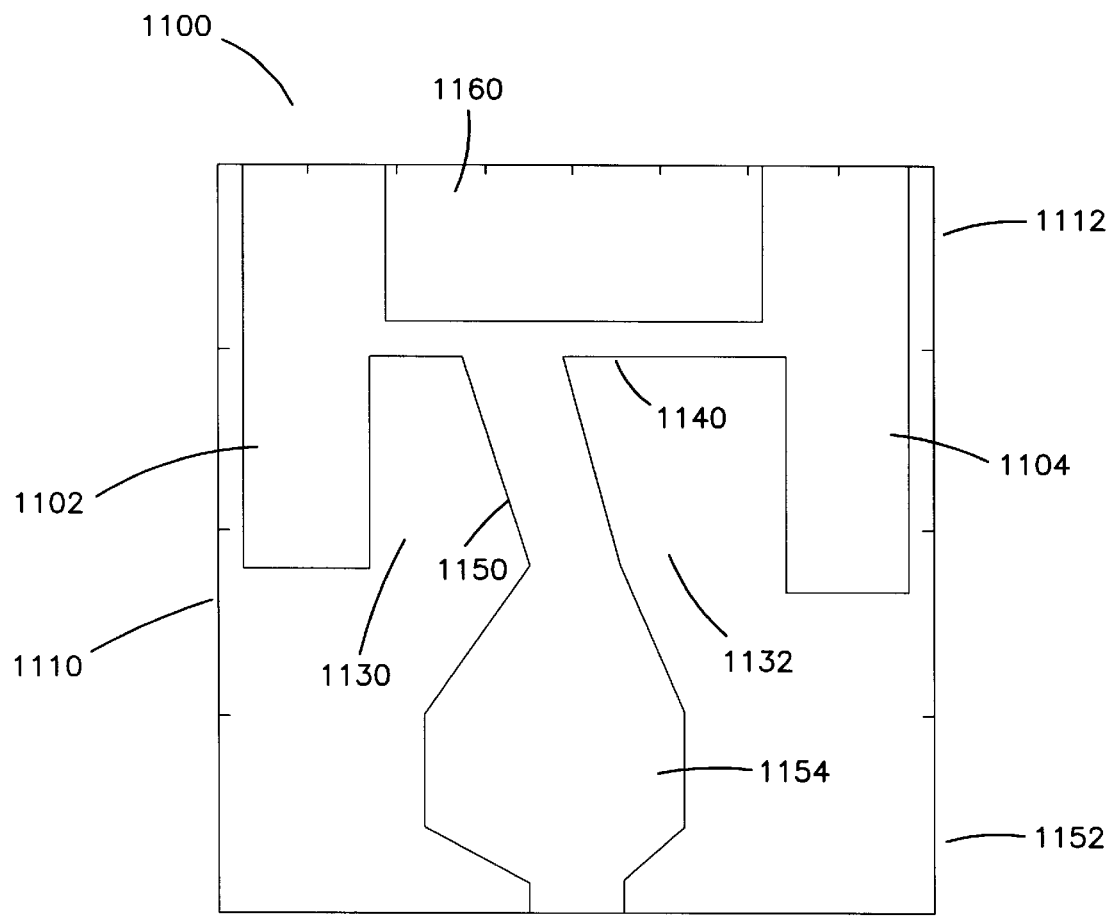
FIG. 11 shows a prior art slider design similar to the slider designs discussed above with reference to FIG. 1.

FIG. 11 shows a slider design 1100 similar to the slider designs discussed above with reference to FIG. 1. The slider design 1100 includes a pair of shortened side rails 1102, 1104, along first and second side edges 1110, 1112. Negative pressure regions 1130, 1132 are defined by side rails 1102, 1104, crossrail 1140 and center rail 1150 which extends toward the trailing edge of the slider 1152 forming a broadened support surface area 1154 whereon a transducer may be disposed (not shown). However, the trailing center rail 1150 for slider design 1100 is skewed at an angle relative to the sides 1110, 1112 of the slider 1100. The skewed center rail 1150 provides a negative ramp fly-height profile. Leading edge pocket 1160 is defined by the side rails 1102, 1104, and crossrail 1140. Still, the slider design 1100 illustrated in FIG. 11 is subject to debris accumulation on crossrail 1140.

Figure 12:
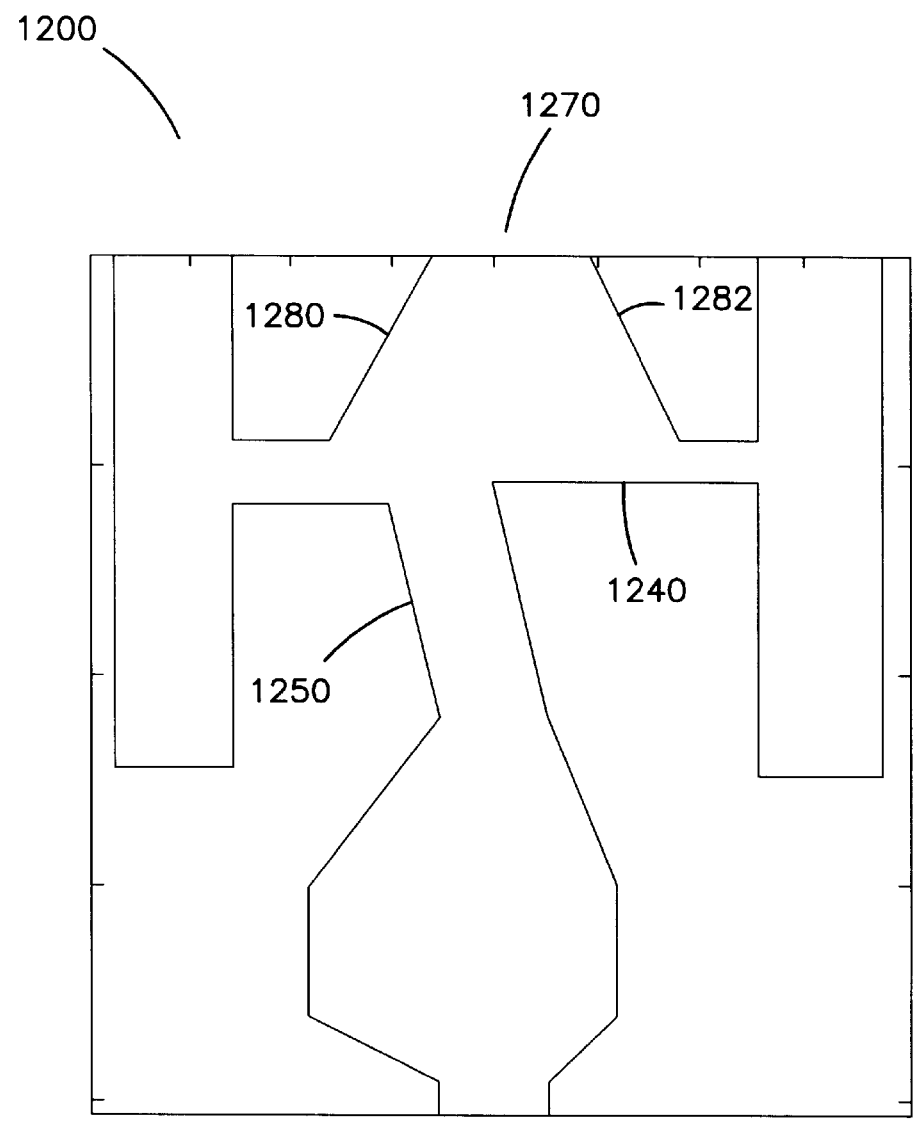
FIG. 12 shows another embodiment of a slider design 1200 according to the present invention which minimizes crossbar debris accumulation.

FIG. 12 shows another embodiment of a slider design 1200 according to the present invention which minimizes crossbar debris accumulation. The slider design 1200 of FIG. 12, includes the skewed center rail 1250 for the negative ramp fly height profile. The slider design 1200 also includes a center rail extension 1270 in front of the crossbar 1240 for minimization of crossbar debris accumulation. The center rail extension 1270 is flared on both sides 1280, 1282 to protect the center rail for both negative and positive skewed air flow conditions.

Figure 13:
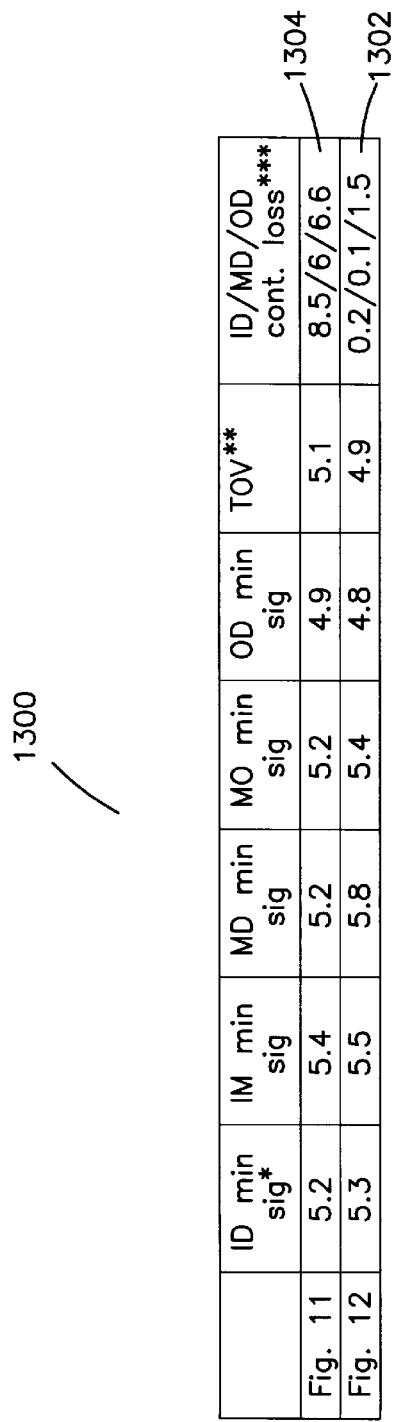
FIG. 13 is a table showing the reduced fly height change due to debris accumulation for the slider design of FIG. 12 as compared to the slider design of FIG. 11.

FIG. 13 is a table 1300 that shows the reduced fly height change due to debris accumulation for the slider design of FIG. 12 1302 as compared to the slider design of FIG. 11 1304. For 100 nano-meters of debris accumulation, the slider design of FIG. 12 1302 exhibits a change of 0.2, 0.1, and 1.5 nano-meters at the inner diameter, middle diameter, and outer diameter respectively. In comparison, the slider design of FIG. 11 1304 exhibits a change of fly height of 8.5, 6, and 6.6 nano-meters at the inner diameter, middle diameter, and outer diameter respectively.

Figure 14:
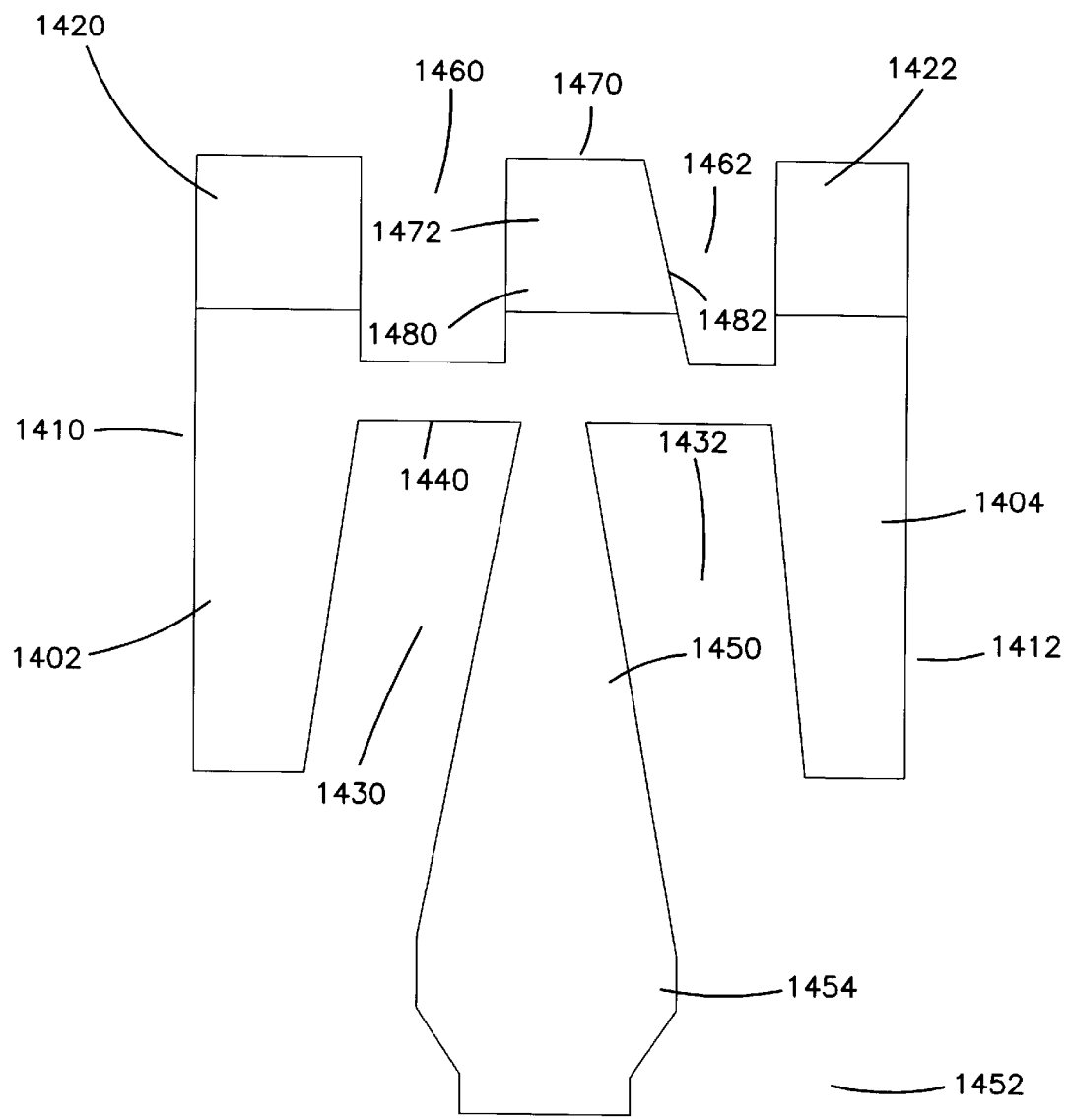
FIG. 14 illustrates another embodiment of a slider design according to the present invention.

FIG. 14 illustrates another embodiment of a slider design 1400. The slider design 1400 includes a pair of shortened rails 1402, 1404, along first and second side edges 1410, 1412 respectively. Each side rail 1402, 1404 has compression features 1420, 1422 to provide improved lift-off performance. The compression features 1420, 1422 may be tapered or alternatively may be stepped, for example. Slider design 1400 also includes negative pressure pockets 1430, 1432 as defined by side rails 1402, 1404, crossbar 1440 and center rail 1450. Center rail 1450 gradually widens to form a support structure surface 1454 toward the trailing edge 1452. Support structure 1454 typically supports a transducer (not shown). Leading edge pockets 1460, 1462 are defined by side rails 1402, 1404 crossbar 1440 and center rail leading edge extension 1470. Extension 1470 includes a compression feature 1472. Further, extension 1470 has two sides 1480, 1482 wherein the right side 1482 is flared to connect the crossbar 1440 to one side of slider 1400.

The foregoing description of the exemplary embodiment of the invention has been presented for the purposes of illustration and description. It is not intended to be exhaustive or to limit the invention to the precise forms disclosed. Many modifications and variations are possible in light of the above teaching. It is intended that the scope of the invention be limited not with this detailed description, but rather by the claims appended hereto.

What is claimed is:

1. An air bearing slider for use in a disk drive, comprising:

a slider body, having a leading edge, a trailing edge, a first and second side, and a lower surface; and an air bearing surface formed on the lower surface, wherein the air bearing surface comprises a crossrail, first and second side leg rails, a trailing central rail and a leading central rail extending from the crossrail toward the leading edge for diverting debris from the crossrail to prevent accumulation thereon and wherein the first and second side leg rails extend from the crossrail toward the leading edge to form two leading edge pockets, and the first and second side leg rails extending toward the trailing edge, the trailing central rail and the crossrail define two negative pressure pockets opposite the crossrail from the leading central rail.

2. The slider of claim 1 wherein the leading central rail comprises a flared side edge.

3. The slider of claim 2 wherein the flared edge expands the width of the leading central rail toward the crossrail.

4. The slider of claim 1 wherein the leading central rail comprises a flared edge.

5. The slider of claim 4 wherein the flared edge expands the width of the leading central rail toward the crossrail.

6. A storage device, comprising:

a storage medium for storing data thereon;

a motor, coupled to the storage medium, for moving the storage medium;

a transducer supported by a slider, the slider being positionable proximate to the storage medium for writing and reading data to and from the storage medium, the slider further comprising:

a slider body, comprising a leading edge, a trailing edge, a first and second side, and a lower surface; and an air bearing surface formed on the lower surface, wherein the air bearing surface comprises a crossrail, first and second side leg rails, a trailing central rail, and a leading central rail extending from the crossrail toward the leading edge for diverting debris from the crossrail to prevent accumulation thereon and wherein the first and second side leg rails extend from the crossrail toward the leading edge to form two leading edge pockets, and the first and second side leg rails extending toward the trailing edge, the trailing central rail, and the crossrail define two negative pressure pockets opposite the crossrail from the leading central rail.

7. The slider of claim 6 wherein the leading central rail comprises a flared edge.

8. The slider of claim 7 wherein the flared edge expands the width of the leading central rail toward the crossrail.

9. The slider of claim 6 wherein the leading central rail comprises a flared edge.

10. The slider of claim 9 wherein the flared edge expands the width of the leading central rail toward the crossrail.

* * * * *